United States Patent
Stolarczyk et al.

(10) Patent No.: US 6,522,285 B2
(45) Date of Patent: Feb. 18, 2003

(54) GROUND-PENETRATING IMAGING AND DETECTING RADAR

(76) Inventors: Gerald L. Stolarczyk, 848 Clayton Hwy., Raton, NM (US) 87740; Larry G. Stolarczyk, 848 Clayton Hwy., Raton, NM (US) 87740

( * ) Notice: Subject to any disclaimer, the term of this patent is extended or adjusted under 35 U.S.C. 154(b) by 0 days.

(21) Appl. No.: 09/820,498

(22) Filed: Mar. 28, 2001

(65) Prior Publication Data

US 2002/0011947 A1 Jan. 31, 2002

Related U.S. Application Data (60) Provisional application No. 60/268,484, filed on Feb. 12, 2001, and provisional application No. 60/214,477, filed on Jun. 27, 2000.

(51) Int. Cl.⁷ .......................... G01S 13/88; G01S 13/00
(52) U.S. Cl. ..................... 342/22; 342/118; 342/175; 342/194
(58) Field of Search ............................... 342/21, 22, 27, 342/28, 82, 89, 118, 175, 189–197, 124–146

(56) References Cited

U.S. PATENT DOCUMENTS

| | | | |
|---|---|---|---|
| 3,775,765 A | * 11/1973 | Di Piazza et al. | 342/22 |
| 3,831,173 A | * 8/1974 | Lerner | 342/22 |
| 4,504,833 A | 3/1985 | Fowler et al. | |
| 4,507,602 A | 3/1985 | Aguirre | |
| 4,620,192 A | 10/1986 | Collins | 342/128 |
| 4,670,753 A | 6/1987 | Vacanti | 342/90 |
| 4,677,438 A | 6/1987 | Michiguchi et al. | 342/22 |
| 5,072,172 A | 12/1991 | Stolarczyk et al. | |
| 5,268,683 A | 12/1993 | Stolarczyk | |
| 5,325,095 A | 6/1994 | Vadnais et al. | 342/22 |
| 5,339,080 A | * 8/1994 | Steinway et al. | 342/22 |
| 5,499,029 A | 3/1996 | Bashforth et al. | 342/22 |
| 5,769,503 A | 6/1998 | Stolarczyk et al. | |
| 5,828,331 A | * 10/1998 | Harper | 342/22 |
| 5,867,117 A | * 2/1999 | Gogineni et al. | 342/22 |
| 6,225,941 B1 | * 5/2001 | Gogineni et al. | 342/22 |

FOREIGN PATENT DOCUMENTS

JP         55-2923 A  *  1/1980  ..................... 342/22

* cited by examiner

*Primary Examiner*—Bernarr E. Gregory
(74) *Attorney, Agent, or Firm*—Richard B. Main (57) ABSTRACT

A ground-penetrating radar comprises a single resonant microstrip patch antenna (RMPA) that is driven by a three-port directional coupler. A reflected-wave output port is buffered by a wideband isolation amplifier and a reflected-wave sample is analyzed to extract measured values of the real and imaginary parts of the load impedance-the driving point impedance of RMPA. Each such port will vary in a predictable way according to how deeply an object is buried in the soil. Calibration tables can be empirically derived. Reflections also occur at the interfaces of homogeneous layers of material in the soil. The reflected-wave signals are prevented from adversely affecting transmitted-signal sampling by putting another wideband isolation amplifier in front of the input port of the directional coupler. A suppressed-carrier version of the transmitted signal is mixed with the reflected-wave sample, and the carrier is removed. Several stages of filtering result in a DC output that corresponds to the values of the real and imaginary parts of the load impedance. The suppressed-carrier version of the transmitted signal is phase shifted 0° or 90° to select which part is to be measured at any one instant.

18 Claims, 8 Drawing Sheets

GROUND-PENETRATING IMAGING AND DETECTING RADAR

This application claims the benefit of Provisional application Ser. No. 60/268,484, filed Feb. 12, 2001, and claims the benefit of Provisional application Ser. No. 60/214,477, filed Jun. 27, 2000.

BACKGROUND OF THE INVENTION

1. Field of the Invention

The invention relates generally to non-invasive methods and systems for probing the earth, and more specifically to radars that can image and detect objects and other anomalies in the ground.

2. Description of the Prior Art

Many valuable and/or dangerous objects are buried in the ground, and digging them up to see what is there is often not possible or practical. Ground-penetrating radars have been developed as a way to "see" what is underground. But conventional methods and equipment have only provided crude hints of things very near the surface.

Michael D. Bashforth, et al., describe a wide band stepped frequency ground penetrating radar in U.S. Pat. No. 5,499,029, issued Mar. 12, 1996. Such relates to attempts to increase the average signal power and to preserving phase information so digital signal processing can extract more information about objects in the soil. The radar transmitter steps in frequency from 100 MHz to 1,000 MHz, and data is taken at 2.0 MHz step intervals. Both in-phase and quadrature data are collected for over 900 samples. The received signals are combined with samples from the transmitter to detect any phase shifting that may have been caused by objects in the ground, e.g., landmines and waste containers.

An earlier technology is described in U.S. Pat. No. 5,325,095, issued Jun. 28, 1994, to Kenneth G. Vadnais, et al. Such discloses a prior art stepped-frequency ground penetrating radar with a less-capable phase locked loop device.

The present inventors, Larry Stolarczyk and Gerald Stolarczyk, describe the measuring of the thickness of ground deposit layers with a microstrip antenna, in U.S. Pat. No. 5,072,172, issued Dec. 10, 1991. Interpolation tables are used to lookup the layer thickness values corresponding to antenna conductance and resonance measurements. Such resonant microstrip patch antenna (RMPA) and their resulting measurements are used to guide coal-seam drum-cutter equipment for more efficient mining of natural deposit ores. The RMPA driving-point impedance ($S_{11}$) changes significantly when a solid, gas, or liquid layer thickness overlying the RMPA varies.

The RMPA can be swept above a soil surface to find buried landmines, utilities, and other shallow-buried objects. These objects don't necessarily need to be made of metal to be found. What is needed is that the dielectric constants of the objects and the medias they are buried in must differ, e.g., for contrast.

Calibrating the RMPA sensor establishes the RMPA driving-point impedance relationship to a layer-measurement value. In prior art mining applications, layers of various thickness needed to be cut with a mining machine so the RMPA impedance at each layer thickness can be recorded. But such prior art calibration procedures proved to be difficult in practice. A better approach is needed that has an independent means of measuring layer thickness that can be run concurrent to any driving-point impedance measurements.

U.S. Pat. No. 5,769,503, issued Jun. 23 1998 to Stolarczyk, et al., describes mounting such RMPA on a rotating drum or arm of a coal, trona, or potash mining machine. A ground-penetrating-radar transmitting antenna and a receiving antenna can be mounted on a cutting drum to detect deeply buried objects and anomalous geology just ahead of the mining. A radar frequency downconverter is used so low-cost yet-accurate measurement electronics can be built. A first phase-locked loop (PLL) is operated at the resonant frequency of the patch antenna or at each sequentially stepped radar frequency. A second PLL is offset from the first PLL by an intermediate frequency (IF) and is called a tracking PLL. The measurement speed can be delayed by the sequential way in which the PLL's lock on to signals, so a solution to that delay is described.

The calibration curves represent an analytical function that has been reconstructed from a set of discrete I and Q data points measured at each height (H). The discrete sensor height calibration data can be used to construct two different polynomials with the independent variable being the physical layer thickness or height (H). The physical height (H) is independently measured with acoustic height measurement electronics during the calibration process or by other means, such as an inclinometer on the boom of a mining machine. The two calibration polynomials are, $$I(H) = \text{Re } H = b_n H^n + b_{n-1} H^{n-1} + \ldots + b_1 H + b_O \quad (1A)$$

and $$Q(H) = \text{Im } H = a_n H^n + a_{n-1} H^{n-1} + \ldots + a_1 H + a_O \quad (1B)$$

U.S. Pat. No. 5,325,095 describes a modulator that sequentially creates in-phase (I) and quadrature phase (Q) shifts in a frequency source signal. The frequency source signal is sequentially shifted by 0° or 180°(in-phase), then by 90° or 270°(quadrature) in passing through the phase modulator to the radar transmit antenna. The electronic circuits employ isolators. Isolators and quadrature modulator transmitters are costly and difficult to build with wide bandwidth. The receiver section of the radar receives the reflected signals from the target and uses a single frequency conversion design to transpose the received radar signal frequency to a lower frequency range where the I and Q signal measurements are sequentially made at each frequency in the stepped-frequency radar method that has become one of the standard ground penetrating radar practices. The I and Q signals contain the antenna sensor information. As is well known in the art, the sensor information is processed in a Fourier transform to transform frequency domain information to time domain information. The time domain information is used to determine the time ($t_O$) for the signal energy to travel to and return back to the radar. By knowing the velocity (V) in a dielectric natural media such as coal $$v = \frac{c}{\sqrt{\varepsilon_c}}$$

where c is the speed of light, $\varepsilon_c$ is the relative dielectric constant of coal (about 6). The distance to the reflective target is $$d = \frac{c}{2\sqrt{\varepsilon_c}} t_O.$$

The relative dielectric constant must therefore be known to accurately to determine distance.

The velocity formula is made more complex whenever the natural media layer is not coal, trona, or some other high-resistivity liquid or solid. The velocity of radio waves generally depends on the frequency and resistivity of the natural medium. It is therefore preferable to simultaneously measure the in-situ dielectric constant, e.g., when using radar to measure depths. Stepped-frequency radars have separate transmitting and receiving antennas, and are circularly polarized antennae. But printed circuit antennas radiate front and back. To counter this, U.S. Pat. No. 5,325,095, teaches the placement of radar-energy absorbing material on one side of the printed circuit board to reduce the back lobe.

The antenna pattern is directed only to one side of the printed circuit antenna. Such antennas are preferably oppositely polarized so that they can be operated in continuous wave (CW) mode and in close proximity to each other. The transmitter and receiver sections operate concurrently. The radar return signals from the target will typically be repolarized opposite to the transmitted signal. The reflected wave can thus be readily measured by the receiving antenna and associated electronics. But not all the reflected signals will be oppositely polarized. An electromagnetic wave traveling in a first media and into a second media is reflected at the interface.

Electromagnetic wave reflection occurs at the interface of two different dielectric medias, and the reflection coefficient can be expressed in Equation (2) as, $$\Gamma = \frac{E_s}{E_p} = \frac{\sqrt{\varepsilon_1} - \sqrt{\varepsilon_2}}{\sqrt{\varepsilon_2} + \sqrt{\varepsilon_1}}; \frac{\sigma}{\omega\varepsilon} \ll 1 \qquad (2)$$

where, $E_s$ is the reflected electric field component of the electromagnetic wave, a vector; $E_p$ is the incident electric field component of the electromagnetic wave, a vector; $\varepsilon_1$ is the relative dielectric constant of the first media; $\varepsilon_2$ is the relative dielectric constant of the second media; $\sigma$ is the electrical conductivity of the media; and, $\omega=2\pi f$ and f is the frequency of the EM wave.

When the dielectric constant of a first-encountered media is greater than a second-encountered media, the reflection coefficient will be positive. The radars described in U.S. Pat. N0. 5,325,095 and 5,499,029 are not effective. There is a need to build a radar antenna that will not be limited in this way.

Whenever the energy applied to the antenna sensor for measurement purposes is changed, there is a finite ring-down time period when measurements cannot be made. After each frequency step, the measurement circuit must wait to the end of the ring down time period before the measurement can be made, and this limits the speed of measurement. When a resonant microstrip patch or radar antenna is positioned in close proximity to the surface of natural media, the driving-point impedance changes from the free-space value. At very close proximity, a severe impedance mismatch condition develops between the transmitter and the antenna sensor. In any event, some of the reflected waves returning from the antenna sensor will propagate back into the modulator and unbalance it. These imbalances can adversely affect the in-phase and quadrature signal generation process. The modulator needs to be isolated from such reflected waves.

The measurement of antenna impedances can be complicated by three-port directional couplers. The observable is the reflection port output signal $e_R$ of a three-port directional coupler that has been connected to the antenna sensor. This can be used to make measurements of natural media parameters, to detect non-metallic and metallic objects, natural media thickness, in-situ stress, and even the dielectric constant of the media. The reflection coefficient ($\Gamma$) is defined as, $$\Gamma = \frac{e_R}{e_i} = \frac{Z_L - Z_o}{Z_o + Z_o} \qquad (3)$$

where, $e_i$ the signal applied to the directional coupler; $e_R$ is the reflection port output signal; $Z_O$ is the characteristic impedance of the circuit driving the antenna; and $Z_L$ is the driving-point impedance of the antenna.

Assuming $e_i$ is constant, the in-phase (I) and quadrature (Q) components of the three-port directional coupler reflective port signal $e_R$ can be measured. Equation (1) can be normalized with respect to $Z_O$ as:

$$\Gamma = \frac{e_R}{e_i} = \frac{\left(\frac{Z_L}{Z_o}\right) - 1}{\left(\frac{Z_L}{Z_o}\right) + 1} \qquad (4)$$

Maximum detection sensitivity occurs when $Z_L$ is near $Z_O$, e.g., the characteristic impedance of the three-port directional coupler. The detection sensitivity is defined as the ratio of an incremental change in coupler output voltage ($\Delta e_R$) to an incremental change in impedance ($\Delta Z_L$). The three-port directional coupler detection sensitivity can be determined from the derivative of $e_R$ versus $^{ZL}/zo$ characteristic. The detection sensitivity reaches a maximum value when $Z_L = Z_O$. Here, a $\Delta Z_L$ change produces a $\Delta e_R$ change in reflection port output voltage. If $Z_L$ is either very high or very low, then there is practically no change in reflected voltage ($\Delta e_R$) with changes in RMPA driving-point impedance.

The transmission line input impedance ($Z_{1n}$) of a coaxial cable is, $$Z_{in} = \left[\frac{Z_L + iZ_o\tan\beta l}{Z_o + iZ_L\tan\beta l}\right]Z_o \qquad (5)$$

where, $\beta$ is the phase constant of the transmission line, and l is the length of the transmission line. If the line length can be made very short, then $Z_{in} = Z_L$.

The transmission line transforms the impedance. For example, if the line is a quarter wavelength, one frequency is terminated by a short or low impedance value and becomes a high input impedance value $Z_{in}$. Clearly, it would be preferable to have an antenna sensor input port measuring circuit that would not be bandwidth limited by an isolator and phase quadrature modulator, and highly sensitive to any RMDA driving-point impedance variation caused by operating it in close proximity to the earth. It would also be preferable not to have the problem of the reflected wave being oppositely polarized from that of the receiver antenna, thus limiting detection sensitivity.

The prior art fails to teach improvements in detection sensitivity that can be achieved when the antenna sensor is in close proximity to natural media. For example, where the measuring circuit is a coupler located in close proximity to the antenna driving-point and the driving-point impedance of the antenna sensor is equal to the characteristic impedance of the coupler.

A single radar antenna is preferred over two antennas, e.g., as were required in the description in U. S. Pat. No. 5,325,095. The relative dielectric constant of media is also preferably measured simultaneously so that the correct relative dielectric constant can be used in determining measurement distance.

What is needed is a method of optimizing the detection and measurement of the RMPA driving-point impedance and reflected signals of an antenna sensor operated in close proximity to natural media. Also needed is a measuring system that correctly maintains the amplitude and phase information in the signal reflected from the antenna sensor and that enables measurement at low frequency, e.g., for low-cost implementations. The prior art further lacks improved RMPA and radar antenna sensors calibration methods.

The mining industry could benefit from being able to detect and image objects and anomalous geology well in advance of drilling and extraction. New methods for measuring the dielectric constant of thick layers and the in-situ stress at the cutting edges of drills and mining machines are needed. The prior art has not provided a radiowave means of sending measured data from the drum or drill-rod that includes vibration, bit force, and temperature.

The military would benefit from being able to safely detect and locate the new type of anti-tank and anti-personnel landmines that use plastic housings instead of metal.

SUMMARY OF THE PRESENT INVENTION

Briefly, a ground-penetrating radar embodiment of the present invention comprises a single RMPA that is driven by a three-port directional coupler. A reflected-wave output port is buffered by a wideband isolation amplifier and a reflected-wave sample is analyzed to extract measured values of the real and imaginary parts of the load impedance. Each such part will vary in a predictable way according to how deeply an object is buried in the soil. Calibration tables can be empirically derived. Reflections also occur at the interfaces of homogeneous layers of material in the soil. The reflected-wave signals are prevented from adversely affecting transmitted-signal sampling by putting another wideband isolation amplifier in front of the input port of the directional coupler. A suppressed-carrier version of the transmitted signal is mixed with the reflected-wave sample, and the carrier is removed. Several stages of filtering result in a DC output that corresponds to the values of the real and imaginary parts of the driving point impedance of the antenna sensor. The suppressed-carrier version of the transmitted signal is phase shifted 0° or 90° to select which part is to be measured at any one instant.

An advantage of the present invention is that a ground-penetrating radar is provided that finds objects and layer boundaries in the ground and ore bodies.

An advantage of the present invention is that a three-port directional coupler and low-cost balanced mixer can be used to transpose the antenna sensor signal to low frequency signal where accurate and low-cost synchronous detection electronics can be applied in the measurement method.

Another advantage of the present invention is that antenna impedance variation that gives rise to reflected waves in the transmit signal path causes minimal effect in the transmit circuits.

Another advantage of the present invention is that the identical antenna sensor measuring circuit can be used with RMPA and microwave horn antennas.

An advantage of the present invention is that the transmit, modulator, and balanced mixer signals are generated with reference to a common crystal oscillator to ensure phase coherence throughout the measurement process.

An advantage of the present invention is that the RMPA sensor can be calibrated to measure overlying dielectric constant and when used with a radar signal processing algorithm enables the accurate measurement of distance through natural media.

An advantage of phase-coherent generation is that an optimum instrument design is realized with respect to the sinusoidal signal embedded in electrical noise. The measurement advantage of synchronous detection are realized in the design.

An advantage of the present invention is that the measured data can be transmitted from the measurement location by radiowaves.

An advantage of the present invention is that a lower cost and higher quality measuring instrument can be provided.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENTS

Figure 1:
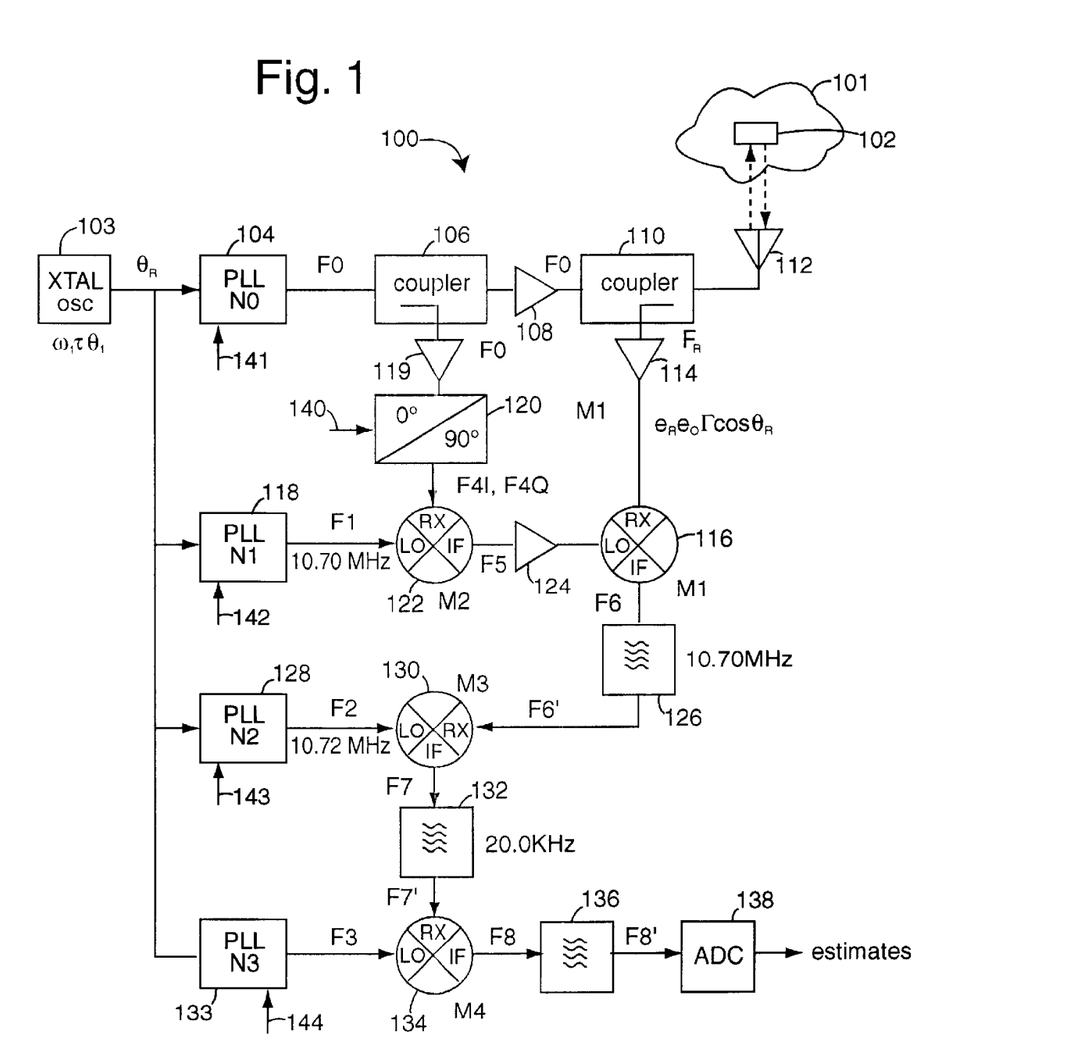
FIG. 1 is a functional block diagram of a ground-penetrating radar system embodiment of the present invention.

FIG. 1 illustrates a ground-penetrating radar system embodiment of the present invention, which is referred to herein by the general reference numeral 100. The system 100 is used to non-invasively penetrate a media 101 with microwave radio energy to find and describe a buried object 102. The system 100 includes a local oscillator 103 that produces a reference frequency (FX) with reference phase ($\theta_1$). A first phase-locked loop (PLL) 104 synthesizes a radio frequency FO, an integer harmonic of FX. The radio frequency FO is passed to a forward-coupling port of a power splitter 106. An output port is connected to a wideband isolation amplifier 108. A three-port directional coupler 110 one-way couples the transmit signal out to a RMPA 112 which illuminates the media 101 and produces reflected waves from the interfaces of the object 102 with the media 101. A reflection port of the three-port directional coupler 110 is used for measurements, e.g., where $e_R=e_O\Gamma \cos \theta_R$, the reflected energy is a function of the output energy of antenna 112.

During operation, such RMPA 112 will be moved close to a natural media or ground surface. A deliberate impedance mismatch is thus created that will result in higher levels of coupler reflection port output voltage or standing wave ratio (VSWR). Any impedance mismatches appearing at any of the ports on a directional coupler will reduce its directivity and isolation between ports. Wideband isolation amplifiers are used to stop reflected waves from reaching the transmitter stages and causing impedance mismatches. The balanced mixers are in particular susceptible to performance degradations under uncontrolled conditions.

Radar signals radiate from the RMPA 112 enter the natural media or ground and are reflected back attenuated and with a change of phase. A wideband isolation amplifier 114 forwards the reflected-wave sample to a first balanced mixer (M1) 116.

A second PLL 118 synthesizes a coherent frequency F1, e.g., 10.70 MHz. A sample of the transmitted signal is provided by the power divider 106 and a second wideband isolation amplifier 119 to a selectable 0°/90° phase shifter 120. A balanced mixer (M2) 122 provides an intermediate frequency (IF) F 5 that is output by a third wideband isolation amplifier 124. The result is a suppressed-carrier signal with upper and lower sidebands offset from the carrier frequency by 10.70 MHz. This in turn mixes with RF in balanced mixer (M1) 116 to produce a first intermediate frequency (IF) F 6. A bandpass filter 126 produces an output F6 '. A third PLL 128 synthesizes another coherent frequency (F2 ), e.g., 10.720 MHz. This is combined with F6' in a balanced mixer 130 to produce a relatively low-frequency IF signal F7, e.g., 20.0 KHz.

Both the oscillator phase shift $\theta_1$ and the frequency are multiplied by No to create the output frequency $N_O \omega_1$. The phase shift $N_O \theta_1$, is canceled on mixer M1. The coupler reflection port voltage $e_R$ dependence on load plane impedance is mathematically represented by Equation (3). The reflection coefficient ($\Gamma$) is a complex number that can be represented as a vector magnitude with phase angle $\theta_R$. Trigonometric identities are used and filter theory is applied to find that, $$F_{8_I}{}^1=k\Gamma \cos \theta_R \quad (6)$$

and $$F_{8_Q}{}^1=k\Gamma \sin \theta_R$$

The ratio of these direct current (DC) values and the inverse tangent values solves for the reflection phase angle $\theta_R$. The constant k is determinable after instrument calibration. The magnitude of the reflection coefficient can be found from either of the above two equations. The measured values of $\theta$ and $\theta_R$, can be applied in Equation (3) to determine the load plane impedance.

A bandpass filter 132 produces a signal F7'. A fourth PPL 133 synthesizes another radio frequency (F3 ). The radio frequency is applied to the LO part of the fourth balanced mixer (M4) 134. Heterodyning produces a signal output F8. An integrating filter 136 processes and outputs a signal F8'. The phase drift ($\theta_1$) in local oscillator 103 is automatically cancelled and does not appear in the output. An analog to digital converter (ADC) 138 outputs a digital signal format, e.g., for further processing by a computer.

A control line 140 selects a 0° or 90° phase-shift through the phase shifter, and this will cause the system 100 to output in-phase or quadrature measurements, e.g., as represented by a DC output voltage of the ADC 138. This control line is typically connected to the same microprocessor that receives the digitized estimates from ADC 138. Such arrangement provides time-multiplexed I and Q amplitude estimates that are indexed to a calibration table, like FIG. 2, to find the depth to the object 102 or the thickness of the media 101 covering the object. The microprocessor is preferably further provided with control signals 141–144 so that the F0–F3 frequencies can be digitally manipulated, e.g., for best transmission penetration and receiver sensitivity on-the-fly as different kinds of medias 101 and objects 102 are inspected.

The estimates can be processed to provide landmine detection, guide drilling or excavation operations, control mining equipment, find lost buried objects in the soil, etc.

The three-port directional coupler 110 is preferably located near the RMPA antenna 112 and is connected to it by a short coaxial cable or strip line. The RMPA antenna 112 is preferably placed close to a natural media surface so the driving-point impedance of an antenna can be adjusted to match the characteristic impedance of the coupler. This technique will maximize the sensitivity of the coupler reflection port signal to small changes in antenna driving-point impedance. An antenna driving-point impedance adjustment is therefore preferred, e.g., with a variable slot built into the antenna structure capacitor.

The balanced mixer placed between the coupler reflected port and the first balanced mixer is such that the signals that modulate the coupler reflection output are phase coherent with the transmit signal. Sidebands are thus produced that represent the phase and amplitude information in the reflection signals. The rest of the circuitry demodulates the information from the carrier.

The output signal of the second balanced modulator (M2) is mixed with a coherent sample of the transmit signal in the first balanced mixer. After filtering, such signal will faithfully replicate the reflection port signal. This simplifies the transceiver design and enables accurate signal measurements with low cost synchronous detection circuits.

Figure 2:
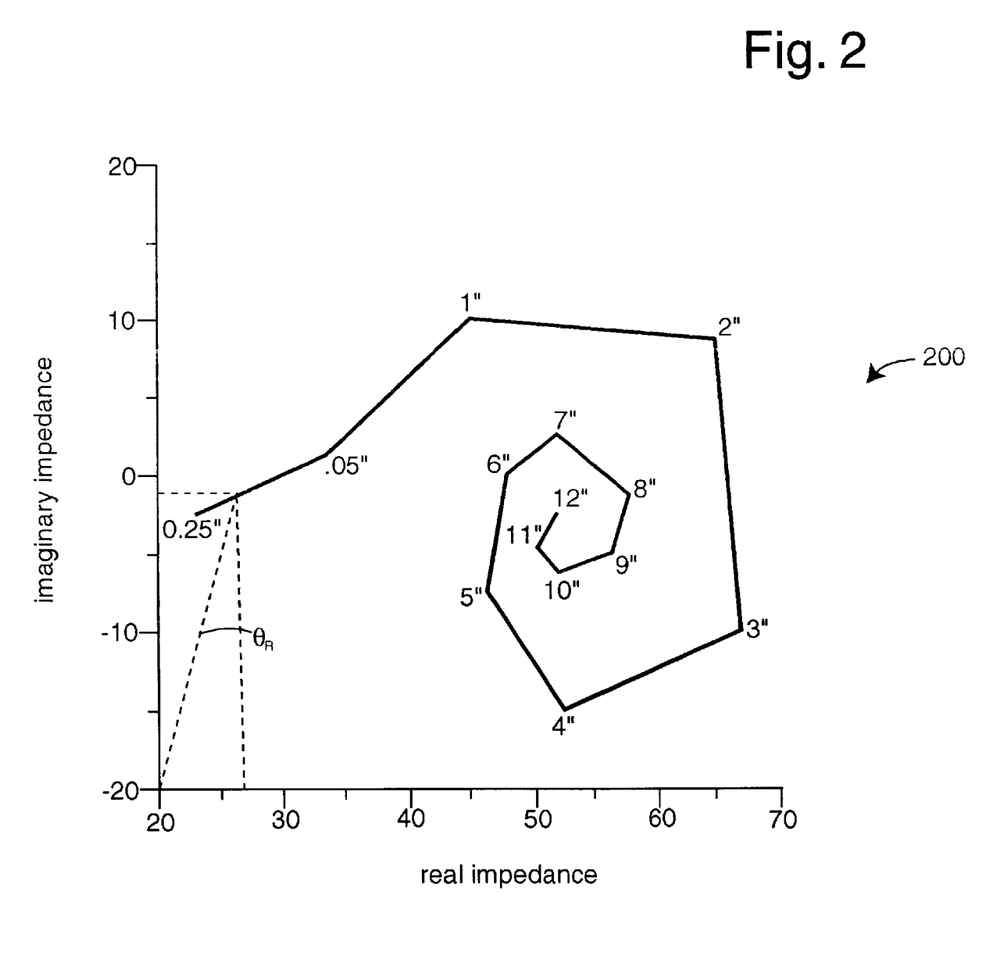
FIG. 2 is a graph of the typical driving-point real and imaginary impedance variations seen in the system of FIG. 1 for various thicknesses of a coal layer deposit.

FIG. 2 charts the relationships that typically develop between the RMPA antenna and the depth to the object and measured values for real (in-phase, I) and imaginary (quadrature-phase, Q). The two vector components of RMPA impedance, real and imaginary, vary differently as a nearby media layer thickness changes. Plotting the imaginary on the Y-axis and the real on the X-axis of a graph yields a calibration curve 200 that spirals to a vanishing point with increasing layer thickness, e.g., from 0.25 to twelve inches.

Figure 3:
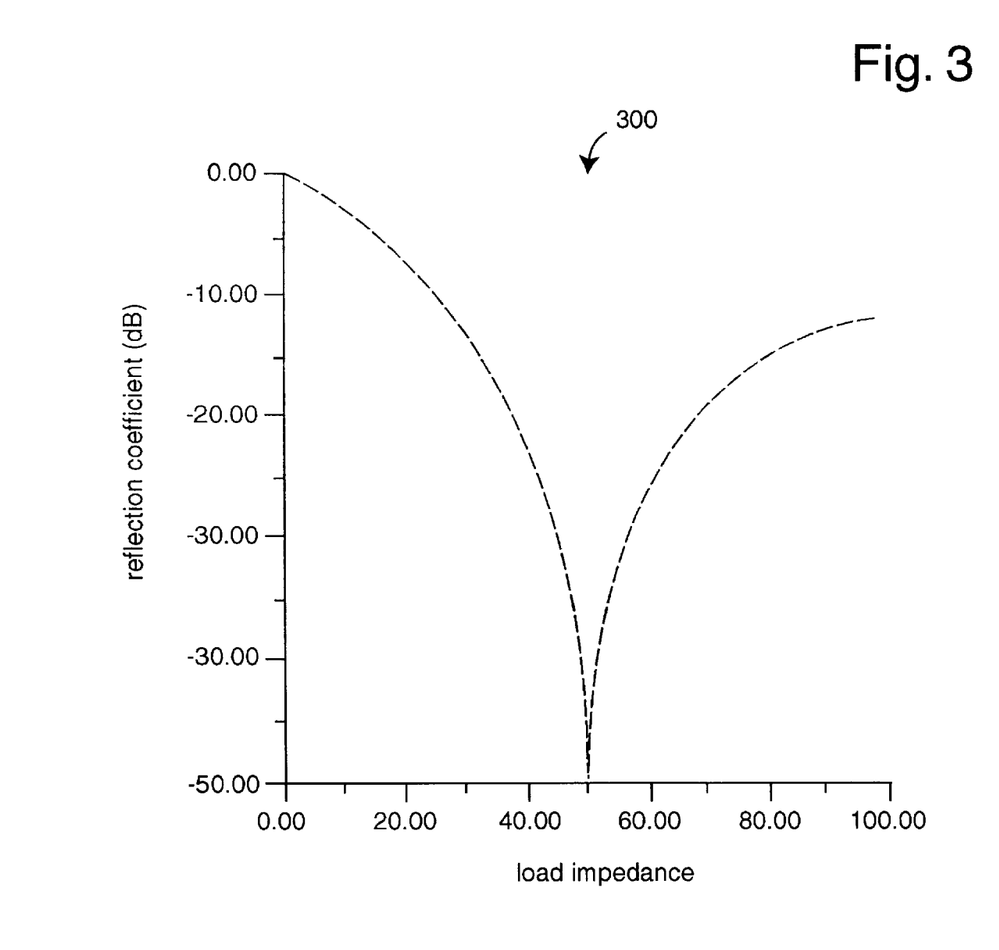
FIG. 3 is a graph of the theoretical impedance response of a directional-coupler reflection port of FIG. 1.

FIG. 3 illustrates the theoretical impedance response 300, e.g., as seen at the reflected-wave sample port of directional coupler 110. The applied signal ($c_O$) from isolation amplifier 108 is assumed to be constant. Detection sensitivity is best on the steepest parts of the curve. Sensitivity is maximum when the RMPA driving point impedance matches the characteristic impedance of the directional coupler.

A method embodiment of the present invention provides for the calibration of such RMPA sensor antennas. Sets of polynomial equations are constructed with independent variables (H) that allow any given antenna driving point impedance value to be measured, and represented as a calibration function with independent variable (H). The difference between the measured and calibration polynomial value is used to detect and image a buried object.

Method embodiments of the present invention can further define such independent variables to be thickness, dielectric constant, or in-situ stress of a geologic media or buried object. The information gathered can be used to construct visual images of the object silhouette and its signal-to-noise ratio. In many cases, the signal-to-noise ratio and the width of the reconstructed object are directly proportional to the probability of non-invasively detecting the object.

Figure 4:
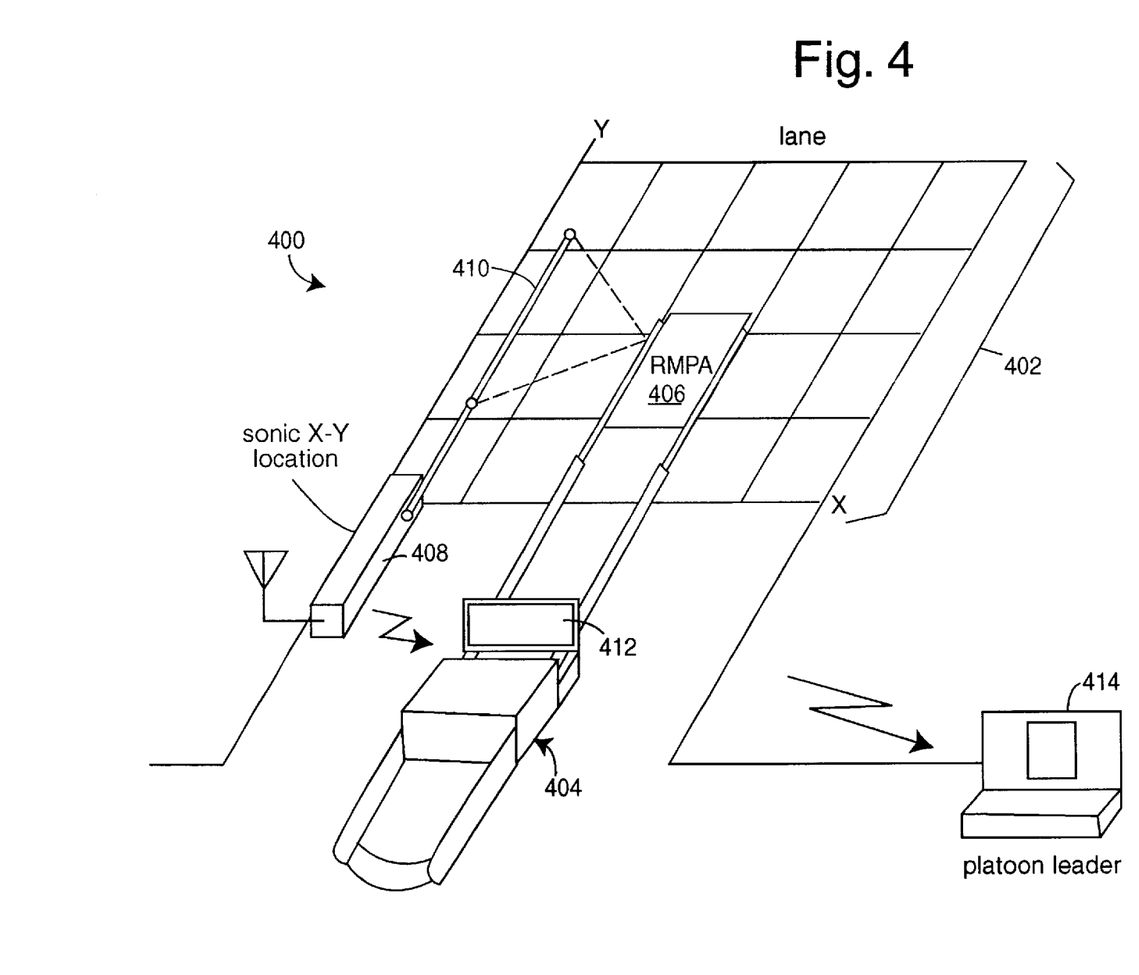
FIG. 4 is a perspective diagram of a landmine detecting system embodiment of the present invention.

FIG. 4 represents a landmine detecting system 400. An area of the ground 402 is systematically scanned by a ground-penetrating radar unit 404. An RMPA sensor 406 is moved in a search pattern over area 402. A sonic position-locating device 408 has a probe 410 that can determine where the RMPA sensor 406 is stationed. A display screen 412 presents a graphical user interface (GUI) which represents the area 402 and any buried objects in the area that have been detected and located. Such information is also relayed to a platoon leader's console 414.

The landmine detecting system 400 is typically calibrated by vertically sweeping the RMPA antenna sensor head 406 up a foot above the soil and then back down to the soil surface while collecting a number of readings at known elevations. During operation, the RMPA sensor head 406 is horizontally scanned over the area 402. The whole of the measured I and Q values are graphically interpreted to represent buried objects on the graphics display 412. Such graphics data may also be radioed to a nearby computer command console 414.

The difference between the calibration value at a specific height is subtracted from the measurement value of impedance in real time. Such difference may be represented by a color or grayscale value on each pixel of the graphics display 412. The difference represents the landmine signal (S) to geologic noise (GN) ratio. The graphical display of the different impedance values can form a number of recognizable silhouette images of buried objects for expert identification.

Figure 5:
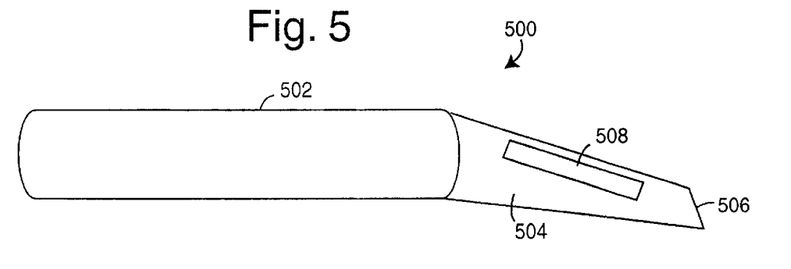
FIG. 5 is a diagram of a trenchless digging machine boring tool that includes a ground-penetrating radar embodiment of the present invention.

FIG. 5 shows a drillrod radar system embodiment of the present invention that can be used to detect utilities and other objects that lie ahead of drilling, and is referred to herein by the general reference numeral 500. The system 500 comprises a drillrod 502 with a bit 504. A cutter 506 on the end makes a ring cut in the borehole as the drillrod 502 is pushed along. A radar antenna 508 is embedded in a milled-out cavity and put behind a polycarbonate or alumina protective cover. The borehole progress can be steered by stopping the cutter rotation, then pushing the drill forward. The shape of the bit 504 will force a new direction. Resuming drillrod rotation will cause drilling to move forward in the new direction. The canter angle of the RMPA antenna and its associated antenna pattern provides an opportunity to both detect and image the object ahead of boring. An image of the borehole face can be created by assigning impedance values to pixels array in plane orthogonal to the drillrod. Rotation of the drill and RMPA antenna pattern provides driving impedance values to the pixels becomes an image of the object.

A further alternative embodiment of the present invention can be used in the monitoring of roadway surfaces for potholes. As a pothole monitoring vehicle moves along a road, any significant breaks in the pavement surface will cause a change in the RMPA impedance values. A global positioning system (GPS) receiver can be combined with this to comprehensively identify approximate road locations with potholes. Later, the pothole data can be transmitted to a highway maintenance patrol to take appropriate action.

I(H) and Q(H) polynomial equations are essential in the interpretation of measured RMPA impedance data. For example, different sets are defined for measuring uncut roof coal layer thickness and floor coal layer thickness when the sensor is flush with coal layer, and when a second protective layer exists between the sensor and the coal layer. The layer thickness (H) is determined from the calibration polynomials equations and measured values by, $$a_n H^n + \ldots + a_1 H + (a_O - Q_m) = 0 \quad (7A)$$

$$b_n H^n + \ldots + b_1 H + (b_O - I_m) = 0 \quad (7B)$$

where $Q_m$ and $I_m$ are the measured values at the unknown layer thickness. There n solutions to each of these equations as, $$(H - H_{1a}) \ldots (H - H_{na}) = 0 \quad (8A)$$

$$(H - H_{1b}) \ldots (H - H_{nb}) = 0 \quad (8B)$$

The correct value of thickness occurs when $H = H_{na} = H_{nb}$.

In the case of a landmine detector, the sensor height is measured using a second acoustical sensor and the RMPA driving-point impedance is measured at each height. The set of calibration polynomial equations applied in the landmine detector is used to improve the landmine signal-to-noise ratio. The noise includes the effects of changes in the type of soil and RMPA height above the soil surface. The sensor height is measured by an independent acoustic wave height sensor. The soil effect is included in the calibration polynomial equation by determining the calibration polynomial directly over the area to be surveyed. Silhouette images of shallow-buried landmines are formed by using a second X-Y position location system to identify each pixel covering the survey area. The operation mode forms silhouette images by subtracting the measured $I_m$ and $Q_m$ from the calibration polynomial equation at each pixel location as, $$d_1 = I_m - I(H_O) \text{ (X lateral)} \quad (9)$$

and $$d_Q = Q_m - Q(H_O) \text{ (Y down range)},$$

where, $I(H_o)$ and $Q(H_o)$ are the values of the polynomial equations, evaluated at the measured sensor height $(H_O)$. In practice, each pixel value is the squared magnitude of the differences, $$D = (d_1)^2 + (d_Q)^2. \quad (10)$$

The silhouette image planes represent the difference in pixel measured values from the noise. Equation (2) suggests that plastic and metal shallow-buried objects will exhibit reflection coefficients that are oppositely polarized from each other. The phase of the reflected or scattered electromagnetic wave from the buried object will depend on burial depth, soil dielectric constant, and sensor height. In some cases, it is possible to determine if the object is plastic or metal by using the sign of the relationship, $$Q = \tan^{-1}(d_1/d_Q) \quad (11)$$

to graphically indicate the upward or downward change from the noise surface. When observing silhouette images reconstructed over the entire square meter survey area, a demonstrator filter is used to determine the probability of detection (PD). The product of the signal-to-noise ratio and the spatial width of the silhouette determines the PD.

Figure 6:
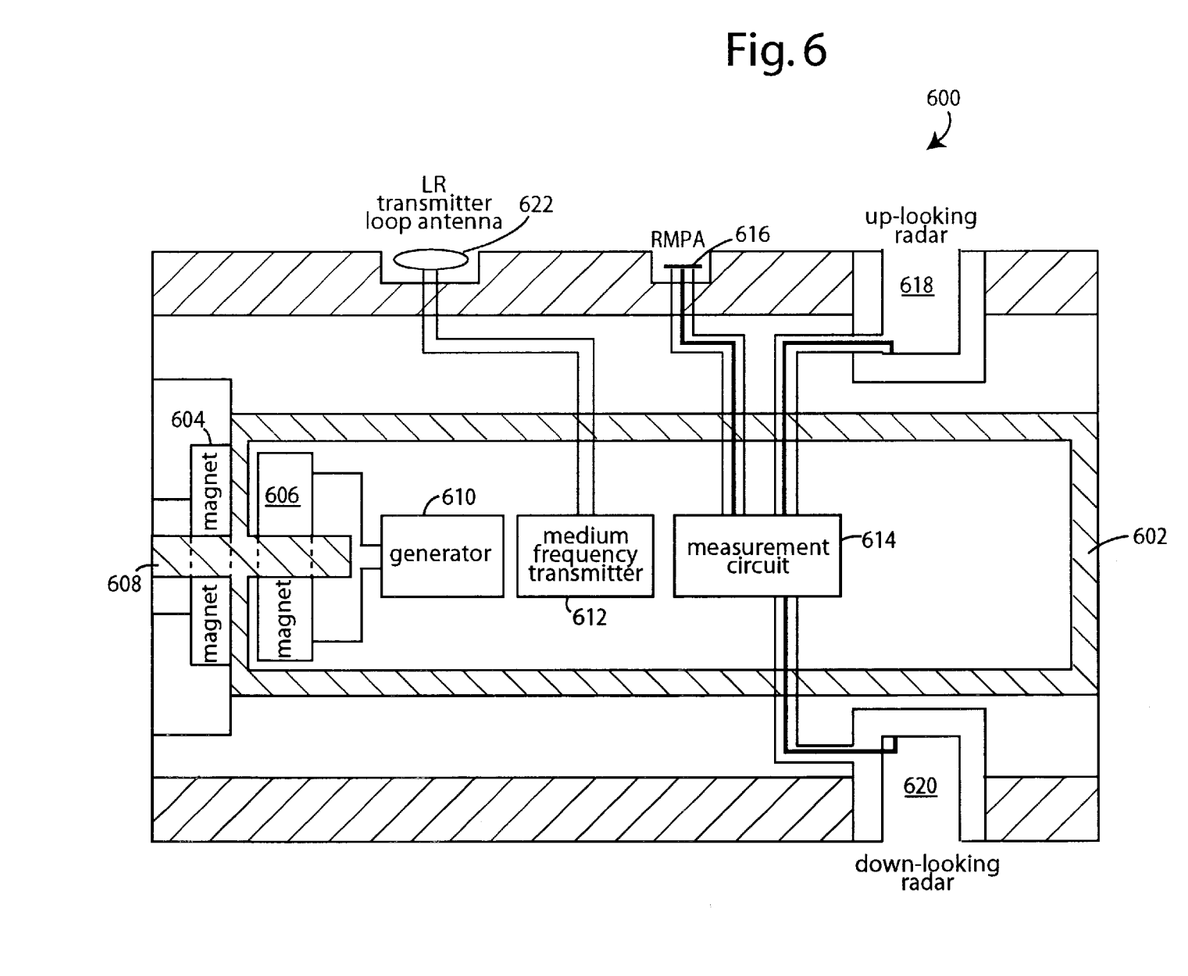
FIG. 6 is a mechanical cross-sectional and electrical functional block diagram of a drillrod radar system embodiment of the present invention.

FIG. 6 illustrates a borehole radar built with the circuits described in FIG. 1. A dielectrically loaded feed of a conventional horn antenna is mounted flush on the surface of the drum or drill-steel to provide a forward-looking radar with minimum back-lobe to detect geologic anomalies ahead of mining. This radar antenna, when combined with RMPA dielectric constant measurements, enables the accurate measurement of distance.

In general, embodiments of the present invention include methods for measuring a reflection port signal for a three-port directional coupler with its output port directly connected to the driving-point of a conventional horn antenna. The reflection port is connected through a first balanced mixer. A 0°/90° phase shifter rotates the signal phase between a forward coupling port of the three-port directional coupler and a second beat frequency balanced mixer. A first beat frequency balanced mixer injection signal is phase coherent with the reflection signal, thereby canceling the phase shift of the PLL. The impedance of the sensor antenna in close proximity to natural media is made as close as possible to the characteristic impedance of the three-port directional coupler, preferably fifty ohms. The beat frequency occurs with phase-coherent mixing in mixer M 4 so as to cancel the phase drift of the crystal oscillator and create in-phase (I) and quadrature (Q) signals derived from the reflection port signal. Such can be used in remote sensing and imaging of non-metallic and metallic landmines.

Embodiments of the present invention are useful in the dimensional measurements of natural deposits of gases, liquids, and solids. They can measure in-situ stress and dielectric constant, e.g., to determine distance to a geologic anomaly or hazardous object ahead of mining. Typical roadway surface potholes could be detected with such equipment. Such measured values may also be used to detect buried utilities and prevent drills and backhoes from damaging these utilities.

One method of calibrating the sensor antenna uses sets of polynomial equations wherein the independent variable represents the value to be measured. Alternative embodiments include solving for the value of the independent variable (H) from a set of polynomial equations that is the difference between the calibration polynomial equation and the measured values of I and Q. Alternative embodiments include determining the value of the independent variable ($H_O$) by independent means and using the difference between the measured and calibration polynomial value to detect and image the object. Other embodiments determine the independent variable as being related to a material thickness, dielectric constant, in-situ stress.

The measurements obtained from embodiments of the present invention can be tomographically processed to construct two and three-dimensional images of the object, e.g., a silhouette image of the object and its associated signal-to-noise ratio. The signal-to-noise ratio and the width of the reconstructed object are generally related to the probability of the object's being detected at all.

FIG. 6 represents a drillrod radar 600. Such comprises an explosion-proof housing 602 into which power must be supplied without using wires or commutator brushes. A pair of magnets 604 and 606 turns on an axle 608 and spins a generator 610. The magnets 604 and 606 form a kind of magnetic clutch that is able to engage through a beryllium-copper wall of the explosion-proof housing 602. The generator 610 supplies operating power to a medium-frequency transmitter 612 and a microwave radar measurement circuit 614.

An RMPA antenna sensor 616 is used to determine a relative dielectric constant ($\epsilon_c$) of any coal surrounding the drillrod radar 600. The dielectric constant of coal is affected by how much moisture is in the coal. Upward and downward-looking radar horns 618 and 620 each provide I and Q signals at each stepped frequency that are interpreted by the measurement circuit 614. The distance through the coal layer to a sedimentary interface can be determined from the radar data if the dielectric constant of the natural media is known.

The radar is typically operated to step through a range of frequencies, e.g., from 2.7 GHz to 3.1 GHz. Each I and Q measurement preferably provides at least ten bits of digital data. These data are transmitted along the drill stem by the medium frequency transmitter 612 and an antenna 622, e.g., as taught by U.S. Pat. No. 5,268,683. A matching medium frequency receiver and computer at a more convenient location are used to determine the product of distance and the dielectric constant, e.g., using fast Fourier transformation technology. The RMPA data is also transmitted according to U.S.Pat. No. 5,268,683, issued to Larry Stolarczyk on Dec. 7, 1993. The water flow through the drill stem causes a propeller (08) to turn generator (09). Flameproof enclosures are required by the Mine Health and Safety Administration (MSHA). Magnetic fields can be used that couple through the explosion-proof case to transfer in operating power, e.g., a super magnet propeller. A magnetic clutch can be formed with driving magnets on either side of a beryllium-copper end adapter. The driven magnet is attached to a generator shaft. The magnetic coupling through the beryllium copper end adapter ensures a seal. Thereby the radar electronics section generates its own power and is contained in an explosion-proof enclosure. The adaptation of the method of measurement is used in the detection of shallow-buried landmines.

FIG. 6 illustrates the use of a magnetic clutch 604–606 to couple-in operating power in an explosion-proof implementation. Hydraulic pumps and turbine-electric generators could also be used to avoid the possibility of generating electric sparks that could ignite an explosive atmosphere.

Referring again to FIG. 1, the crystal oscillator phase shift $\theta_1$ is multiplied by the full multiplication factor $N_O$ and the frequency of the crystal oscillator is multiplied by $N_O$ creating the output frequency $N_O \omega_1$. After filtering, the phase shift $N_O \theta_1$, is canceled on balanced mixer M1. The coupler reflection port voltage $e_R$ dependence on driving point impedance is mathematically represented by Equation (3). The reflection coefficient ($\Gamma$) is a complex number that can be represented as a vector magnitude with phase angle $\theta_R$. Using trigonometric identities and applying filter theory, it can be shown that, $$F_8 I = k\Gamma \cos \theta_R \qquad (12)$$

and $$F_8 Q = k\Gamma \sin \theta_R .$$

The ratio of these direct current (DC) values can be used to solve for the inverse tangent values. And the reflection phase angle $\theta_R$ can be readily determined. Calibration of the instrument will determine the correct constant K. The magnitude of the reflection coefficient can be found from either of the above two equations. The circuits isolate the phase shifter from any blaring reflected signal. The measured values of $\Gamma$ and $\theta_R$ can be applied in Equation (3) to determine the driving point impedance.

The following equations help further describe the necessary working conditions of the system 100 in FIG. 1, and illustrate what each functional element must do to process the signals involved. FR is the reflected-wave output from the reverse port of directional coupler 110. FX is the output of oscillator 103. F0 is the output of PLL 104. F1 is the output of PLL 118. F2 is the output of PLL 128. F3 is the output of PLL 133. F4I and F4Q are the selected in-phase and quadrature outputs of phase shifter 120. F5 is the output of mixer 122. F6 is the output of mixer 116. F6' is the filtered output of bandpass filter 126. F7 is the output of mixer 130. F7' nis the filtered output of bandpass filter 132. F8 is the output of mixer 134. F8' is the filtered output of bandpass filter 136.

$$FX = A\cos(\omega_1 t + \theta_1)$$

$$F0 = B\cos(N_0\omega_1 t + N_0\theta_1)$$

$$F1 = C\cos(N_1\omega_1 t + N_1\theta_1)$$

$$F2 = C\cos(N_2\omega_1 t + N_2\theta_1)$$

$$F4I = D\cos(N_0\omega_1 t + N_0\theta_1)$$

$$F4Q = D\sin(N_0\omega_1 t + N_0\theta_1)$$

$$FR = E\Gamma\cos(N_0\omega_1 t + N_0\theta_1 + \theta_R)$$

$$N_2 - N_1 = 1$$

Placing the quadrature hybrid into the 0° position yields:

$$F5I = F1 \times F4I = CD\cos(N_1\omega_1 t + N_1\theta_1)\cos(N_0\omega_1 t + N_0\theta_1) =$$
$$\frac{CD}{2}[\cos[(N_1 + N_0)\omega_1 t + (N_1 + N_0)\theta_1] + \cos[(N_1 - N_0)\omega_1 t + (N_1 - N_0)\theta_1]]$$

$$F6I = F5 \times FR = \frac{CDE\Gamma}{2}\begin{bmatrix}\cos[(N_1+N_0)\omega_1 t + (N_1+N_0)\theta_1] \times \\ \cos(N_0\omega_1 t + N_0\theta_1 + \theta_R) + \\ \cos[(N_1-N_0)\omega_1 t + (N_1-N_0)\theta_1] \times \\ \cos(N_0\omega_1 t + N_0\theta_1 + \theta_R)\end{bmatrix}$$

$$= \frac{CDE\Gamma}{4}\begin{bmatrix}\cos[(N_1+2N_0)\omega_1 t + (N_1+2N_0)\theta_1 + \theta_R] + \\ \cos(N_1\omega_1 t + N_1\theta_1 - \theta_R) + \\ \cos(N_1\omega_1 t + N_1\theta_1 + \theta_R) + \\ \cos[(N_1-2N_0)\omega_1 t + (N_1-2N_0)\theta_1 + \theta_R]\end{bmatrix}$$

After filtering $$F^16I = \frac{CDE\Gamma}{4}[\cos(N_1\omega_1 t + N_1\theta_1 - \theta_R) + \cos(N_1\omega_1 t + N_1\theta_1 + \theta_R)]$$

$$= \frac{CDE\Gamma}{2}[\cos(\theta_R)\cos(N_1\omega_1 t + N_1\theta_1)$$

$$F7I = F2 \times F^1 6I = \frac{C^2 DE\Gamma}{4}\cos(\theta_R)[\cos(N_2\omega_1 t + N_2\theta_1)\cos(N_1\omega_1 t + N_1\theta_1)]$$

$$= \frac{C^2 DE\Gamma}{4}\cos(\theta_2)\begin{bmatrix}\cos[(N_2+N_1)\omega_1 t + (N_2+N_1)\theta_1] + \\ \cos[(N_2-N_1)\omega_1 t + (N_2-N_1)\theta_1]\end{bmatrix}$$

After filtering $$F^17I = \frac{C^2 DE\Gamma}{4}\cos(\theta_R)\cos[(N_2-N_1)\omega_1 t + (N_2-N_1)\theta_1]$$

where $N_2 - N_1 = 1$, $$F^17I = \frac{C^2 DE\Gamma}{4}\cos(\theta_R)\cos(\omega_1 t + \theta_1)$$

$$F8I = FX \times F^17I$$

$$= \frac{AC^2 DE\Gamma}{4}\cos(\theta_R)\cos(\omega_1 t + \theta_1)\cos(\omega_1 t + \theta_1)$$

and applying filter:

$$F^18I = \frac{AC^2 DE\Gamma}{4}\cos(\theta_R)$$

Switching the quadrature hybrid to the 90° position and following similar techniques as shown above, reveals that:

$$F^18Q = \frac{AC^2 DE\Gamma}{4}\sin(\theta_R)$$

Let $I = F^18Q$ and $Q = F^18Q$ and thus, $$\Gamma \propto \sqrt{I^2 + Q^2} \text{ and,}$$

$$\theta_R = \tan^{-1}\frac{Q}{I}$$

Figure 7:
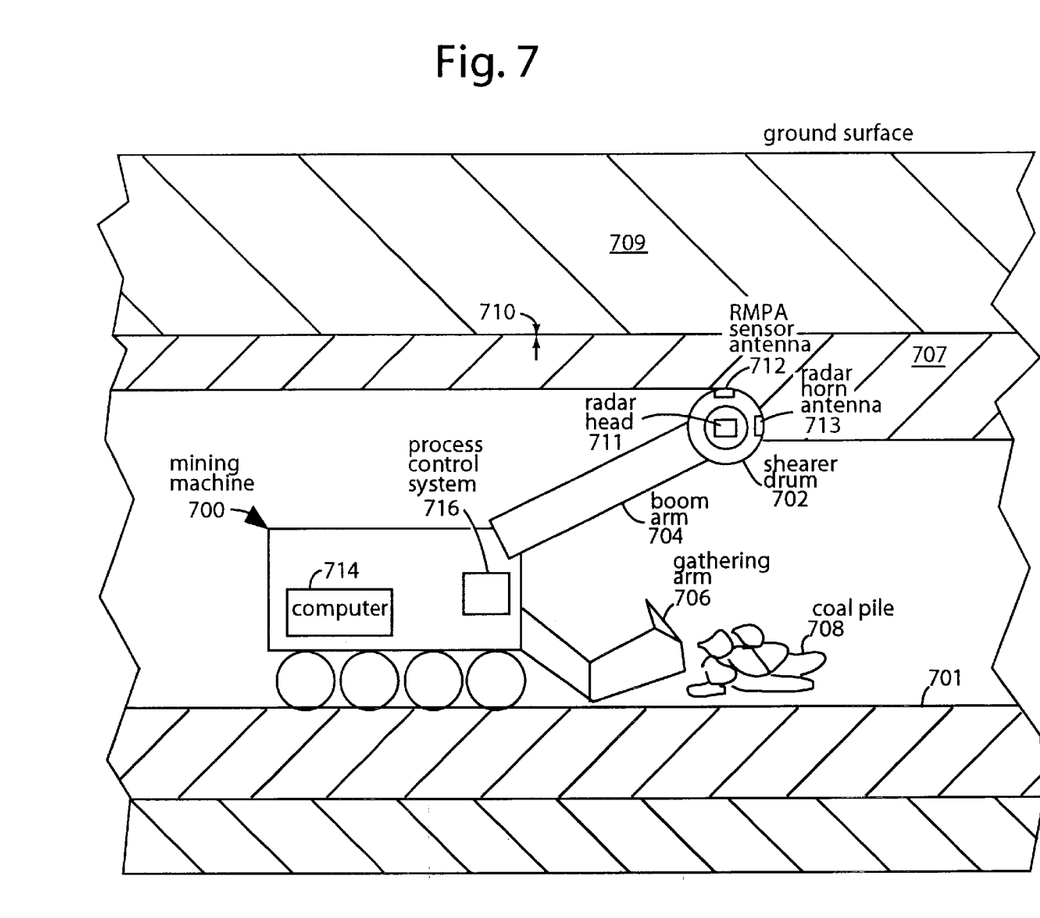
FIG. 7 is a diagram of a coal mining machine embodiment of the present invention.

FIG. 7 represents a coal mining operation in which a mining machine 700 moves along an entry in a coal seam with remaining floor coal 701. A rotating shearer drum 702 is attached to a boom arm 704 so it can be raised and lowered. A gathering arm 706 collects material cut from an overhead coal seam 707 layer. The shearer drum 702 drops a cut coal pile 708 that is swept up by the gathering arms 706. An overburden 709 exits above the coal seam 707 and it is important to efficient mining operations not to allow the shearer drum 702 to bite too near a sedimentary interface 710. A ground-penetrating radar head 711 is mounted inside the shearer drum 702 and is similar to system 100 in FIG. 1. An RMPA sensor antenna 712 is the equivalent of the RMPA 112 in FIG. 1. Such RMPA sensor antenna 712 and a radar horn antenna 713 rotate with the shearer drum 702. The ground-penetrating radar head 711 sends a modulated UHF frequency band signal to a computer 714 for processing. Such computer has a graphics display and software that show how much more of coal seam 707 can be removed by the shearer drum 702 before getting too close to the overburden 709. A process control system 716 receives feedback signals from the computer 714 and automatically controls the movements of the boom arm 704 and shearer drum 702.

When the shearer drum 702 and the RMPA antenna sensor 712 rotate to the straight up (0°) position, the uncut roof coal thickness can be measured. If the radar horn 713 is facing straight ahead (90°), it can be used at that instant to detect objects ahead of the mining. When the drum rotates the RMPA antenna sensor 712 to the straight ahead (90°) position, the in-situ relative dielectric constant and stress can be determined. The radar antenna 713 is similar to that shown in FIG. 5. The antenna feed is loaded with a low-loss epoxy, e.g., one with a dielectric constant of six. The RMPA and radar feed antennas 712 and 713 can thus cooperatively measure uncut coal thickness and detect the physical distance to anomalous conditions ahead of the mining.

The distance between the sensor antenna 712 and the interface of the coal seam 707 and overburden 709 varies as the rotational position of the shearer drum 702 advances. So an improvement in calibration can be realized by adding a second and independent sensor. In the case of a drum mining machine, an inclinometer is used to measure how the machine boom angle corresponds to the uncut layer thickness. The calibration process consists of first cutting away the entire coal layer with the mining machine and then moving the machine boom with a drum at the end through its range of inclination angles and measuring the physical distance of RMPA sensor antenna 712 to the sedimentary rock interface at each angle. Then the calibration process is completed by moving the mining machine into position on a thick uncut layer and then proceeding to cut the layer and measuring the antenna driving-point impedance at each inclination angle.

Figure 8:
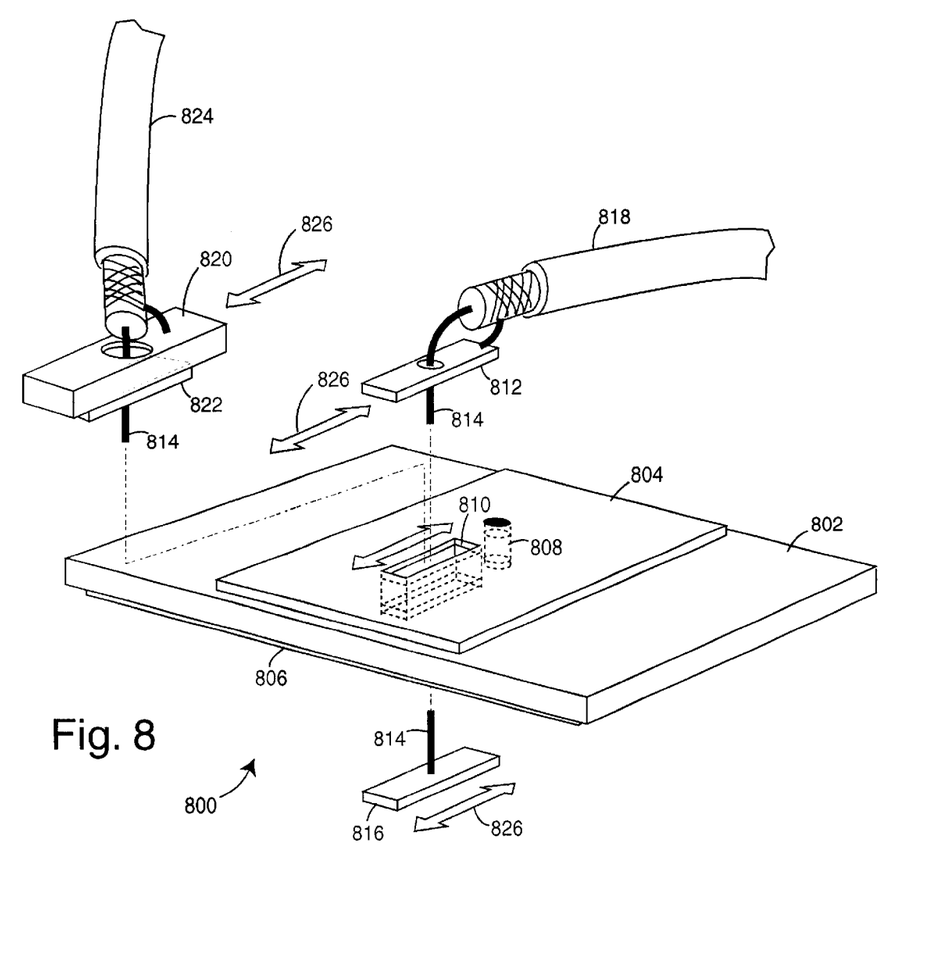
FIG. 8 is a diagram of a RMPA driving point impedance adjustment mechanism.

FIG. 8 represents an adjustable driving-point impedance resonant microstrip patch antenna (RMPA), and is referred to herein by the general reference numeral 800. The detection sensitivity of RMPA antenna sensors, in general, depends strongly on matching the driving-point impedance of RMPA to that of the directional coupler. RMPA embodiments of the present invention provide a mechanically adjusted driving-point impedance. The RMPA 800 includes a ceramic alumina substrate 802 on which is disposed a microwave patch antenna 804 and a ground plane 806 on opposite sides. A ground-point via 808 connects a point on the antenna 804 to the ground plane 806. The point at which a signal take-off is connected on the antenna 804 relative to the ground-point via 808 will determine the characteristic impedance seen by the directional coupler attached to it.

A slot 810 is therefore provided that allows a sliding, adjustable feed contact to be made. It is also possible to make the feedpoint fixed and have the ground-point via slide around. But this later arrangement would affect the resonant frequency of RMPA 800 as well. A conventional wormscrew mechanism can be constructed that will allow fine adjustments to be made in the separation distance between the feedpoint and groundpoint.

A ground cover 812 electrically seals the top of slot 810 and allows a feedwire 814 to pass through without shorting it. A bottom cover 816 electrically seals the bottom of slot 810 and carries with it the feedpoint. A coaxial wire 818 enters from the side and its outside foil attaches to the top cover 812 for ground.

Alternatively, a top entry can be accommodated by an insulated top cover 820. A conductive foil 822 electrically seals the top of slot 810 and allows a coax 824 to make a direct entrance through a small clearance hole. Arrows 826 indicate the direction of gang movement that the driving-point impedance mechanics should induce.

Figure 9:
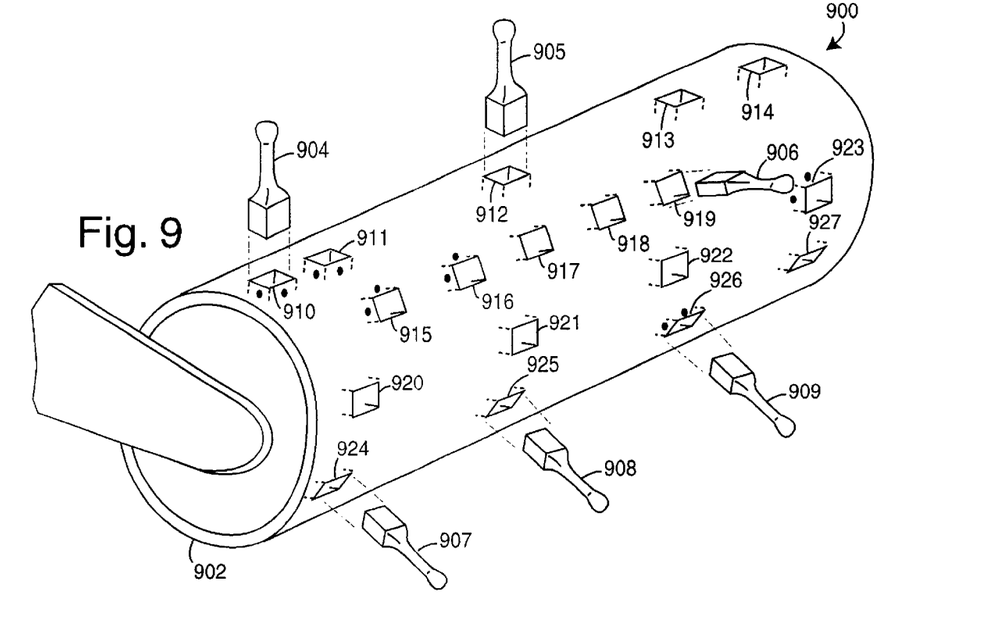
FIG. 9 is a perspective view of an excavator cutting drum with demountable cutting picks, and some of the mounting holes in the drum face are instrumented with stain gauge sensors to help analyze various lacing patterns for the cutting picks.

FIG. 9 is a perspective view of an excavator system 900. A cutting drum 902 is fitted with a number of demountable cutting picks 904–909. These picks can be placed in a variety of "lacing" patterns in a set of mounting holes 910–927. A few of these mounting holes are instrumented with stain gauge sensors to help analyze mechanical strains and impacts encountered by the picks during operation. FIG. 9 represents these strain-gauge sensors with small black dots in the mounting holes.

Various lacing patterns for the cutting picks can be tried to see which minimizes the forces the cutting picks are subjected to. The cutting of coal, trona, and potash is such that the picks induce stress fractures in the media that radiate from the impact points. The next pick that strikes the area is preferably located on the cutting drum to continue hitting the previous stress fracture. Such strategy reduces the operating power needed to mine each ton of ore and reduces the ordinary wear and tear on the machines. Ore dust and other fines are also minimized, and so are easier to control and less of a nuisance. The nature of media material will therefore dictate the optimum lacing patterns, and has in the past been empirically determined.

If the side and drag forces are monitored for a set of picks, the optimum location of picks can be mathematically determined for the particular deposit. Typical cutting machines are customarily rebuilt and reconfigured each year, and the predicted optimum pick locations can be selected.

The many patent documents referred to herein and in the references made-of-record would be useful in various implementations of embodiments of the present invention, so each and all are incorporated herein by reference.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A close-proximity radar system, comprising:

a sensor antenna for transmitting a radio signal and for receiving any reflected signals, and having a driving point impedance that depends on dimensional and dielectric constant characteristics of any objects proximately disposed in a material media and any radio reflected-wave signals returned by them;

a first directional coupler connected by its output port to the sensor antenna, and having a reverse port providing for samples of said reflected signals, and also having an input port;

a second directional coupler operating as a power splitter and having an input port connected to a radio frequency oscillator, a forward output port providing for samples of signals from said radio frequency oscillator, and another output port;

a wideband isolation amplifier connected between said output port of the second directional coupler and said input port of the first directional coupler, and providing an isolation of said samples of signals from said radio frequency oscillator from said reflected signals; and a demodulator including a plurality of mixers connected to demodulate said reflected signals with said samples of signals from said radio frequency oscillator, and for providing an output signal related to at least one of a reactive and resistive component of said antenna driving point impedance and said any reflected-wave signals.

2. The system of claim 1, further comprising:

an interpreter for converting said output signal from the demodulator into at least one of a distance estimate of said objects from the sensor antenna, a dielectric constant estimate of said material medias, a thickness estimate of said material medias, a size estimate of any of said objects disposed in said material medias, and a stress estimate of any stresses existing in said material medias.

3. The system of claim 1, further comprising:

a mixer included in the demodulator and providing for removal of a carrier frequency from said reflected-wave signals with said samples of signals from said radio frequency oscillator, and for producing a suppressed-carrier double-sideband output.

4. The system of claim 1, wherein:

the electrical power is generated by a water turbine.

5. The system of claim 1, wherein:

the antenna I and Q impedance values are transmitted by radiowaves to remote computer for processing.

6. The system of claim 5, wherein:

other measurement data such as pick block side and drag force value are measured and transmitted by radiowaves to computer for processing.

7. The system of claim 1, wherein:

an impedance spiral function is used in data processing to determine the specific characteristics.

8. The system of claim 7, wherein:

an inclinometer on the cutting boom relates the impedance spiral to uncut thickness.

9. The system of claim 1, wherein:

a radar distance and dielectric product is determined by fast Fourier transform processing of radar data simultaneous to a determination of the dielectric constant from an independent measurement.

10. The system of claim 1, wherein:

the RMPA has a mechanical means to adjust the driving point impedance to match a characteristic impedance of the feed.

11. A ground-penetrating radar system, comprising:

a reference oscillator providing for a reference-frequency signal (FX);

a first phase-locked loop (PLL1) connected to convert said reference-frequency signal into a first frequency (F1) signal;

a second phase-locked loop (PLL2) connected to convert said reference-frequency signal into a first frequency (F2) signal;

a third phase-locked loop (PLL0) connected to convert said reference-frequency signal into the first transmitter frequency (FO);

at least one of a resonant microstrip patch antenna (RMPA) and microwave antenna that provide a feed;

a first three-port directional coupler with an input port, an output port connected to the feed, and a reflected-sample port;

a first wideband isolation amplifier connected between the transmitter (PLL0) and said input port of the first three-port directional coupler;

a second wideband isolation amplifier connected between reflected-sample port of the first three-port directional coupler and the first mixer; and a driving-point impedance measurement device.

12. The system of claim 11, wherein:

the PLL1 further provides said F1 signal in fixed harmonic frequencies of said reference-frequency signal.

13. The system of claim 11, wherein:

the PLL2 further provides said F2 signal in fixed harmonic frequencies of said reference-frequency signal.

14. The system of claim 11 wherein:

the PLL0 further provides an FO signal that can be manipulated to a particular harmonic of said reference frequency signal.

15. The system of claim 11, wherein:

the first mixer output is bandpass filtered and comprises a single-frequency term with an amplitude related to a magnitude, and a phase angle related to at least one of an antenna sensor phase angle driving point impedance or the reflection coefficient of the antenna feed.

16. The system of claim 11, wherein:

the output signal of the final mixer is after filtering, a DC term which is proportional to the magnitude and phase angle of the reflection coefficient of the feed.

17. The system of claim 11, wherein:

the phase shift of 90° causes a second DC term, the ratio of which is the cotangent of the phase of the reflection coefficient.

18. The system of claim 11, wherein:

the phase value is used to solve for the magnitude of the reflection coefficient.

* * * * *

UNITED STATES PATENT AND TRADEMARK OFFICE
CERTIFICATE OF CORRECTION

PATENT NO.    : 6,522,285 B2
DATED         : February 18, 2003
INVENTOR(S)   : Gerald L. Stolarczyk and Larry G. Stolarczyk It is certified that error appears in the above-identified patent and that said Letters Patent is hereby corrected as shown below:

Column 13,
Lines 35-40, replace the table with the following:

$$= \frac{CDET}{4} \begin{bmatrix} \cos\left[(N_1 + 2N_0)\omega_1 t + (N_1 + 2N_0)\theta_1 + \theta_R\right] + \\ \cos\left(N_1\omega_1 t + N_1\theta_1 - \theta_R\right) + \\ \cos\left(N_1\omega_1 t + N_1\theta_1 + \theta_R\right) + \\ \cos\left[(N_1 - 2N_0)\omega_1 t + (N_1 - 2N_0)\theta_1 - \theta_R\right] \end{bmatrix}$$

Line 48, replace the table with the following:

$$F71 = F2 \times F'_6 = \frac{C^2 DET}{4} \cos(\theta_R)\left[\cos(N_2\omega_1 t + N_2\theta_1)\cos(N_1\omega_1 t + N_1\theta_1)\right]$$

Lines 51-52, replace the table with the following:

$$= \frac{C^2 DET}{4} \cos(\theta_R) \begin{bmatrix} \cos\left[(N_2 + N_1)\omega_1 t + (N_2 + N_1)\theta_1\right] + \\ \cos\left[(N_2 - N_1)\omega_1 t + (N_2 - N_1)\theta_1\right] \end{bmatrix}$$

Signed and Sealed this

Second Day of March, 2004

JON W. DUDAS
*Acting Director of the United States Patent and Trademark Office*